UNITED STATES PATENT OFFICE.

BENJAMIN T. BROOKS AND HARRY ESSEX, OF PITTSBURGH, PENNSYLVANIA, ASSIGNORS TO GULF REFINING COMPANY, OF PITTSBURGH, PENNSYLVANIA, A CORPORATION OF TEXAS.

MANUFACTURE OF ALCOHOLS.

1,221,667.   Specification of Letters Patent.   Patented Apr. 3, 1917.

No Drawing.   Application filed March 22, 1916.   Serial No. 85,857.

*To all whom it may concern:*

Be it known that we, BENJAMIN T. BROOKS and HARRY ESSEX, citizens of the United States, and residents of Pittsburgh, in the county of Allegheny and State of Pennsylvania, have invented certain new and useful Improvements in the Manufacture of Alcohols, of which the following is a specification.

This invention relates to the manufacture of alcohols; and it comprises a method of making amyl (pentyl) alcohol and other high boiling monohydric alcohols containing five or more carbon atoms from the corresponding chlorids, wherein said chlorids are heated, such heating being best done under pressure, with a mixture comprising methyl alcohol and a formate, thereby producing methyl formate, a chlorid and the desired higher alcohols, the reaction mixture being subsequently treated to recover the excess of methyl alcohol, the methyl formate and the excess of the formate used, as well as the alcohols produced, such methyl formate being subsequently reconverted into a formate and methyl alcohol for reuse, such process being particularly adapted to the manufacture of commercial amyl alcohol or fusel oil from chlorinated fractions of gasolene or other low boiling petroleum oils; all as more fully hereinafter set forth and as claimed.

Fusel oil, which for the present purposes may be considered as composed of a mixture of the various amyl or pentyl alcohols ($C_5H_{11}.OH$) with smaller amounts of alcohols containing more and less carbon, is a material of high price, the natural source of supply being practically limited to certain fractions obtained in the manufacture of grain alcohol. As we have found, and have elsewhere described, materials may be made from certain gasolene fractions which are composed very largely of the monochlor substitution products of the hydrocarbons containing five carbon atoms. Usually, these materials also contain, to a less extent, chlorin substitution products of higher and lower hydrocarbons. The amount of these other products will depend of course upon the accuracy with which the fractionation of the original gasolene or like oil is conducted. Suitable raw materials for this purpose may be made by fractioning commercial gasolene to obtain the portions distilling from 25° to 45° C. Other suitable materials may be made by producing similar fractions from what is known as casing head gasolene. By proper care in chlorination (see application of Brooks, Essex and Smith, Serial No. 65,826, filed December 8, 1915; patented July 18, 1916, Ser. No. 1, 191,916) these fractions, which may hereinafter be termed low boiling gasolenes for the sake of a name, may be converted into monochlor derivatives; that is, into bodies which differ from the original hydrocarbons by the entry of one chlorin atom, and only one, in the molecule in substitution for a hydrogen atom. The monochlor substitution products obtained from the stated gasolene fractions will generally boil between around 95 and 140° C. It is monochlorinated material of this nature which we advantageously use in the present invention.

This monochlorinated material consists for the greater part of chlorinated pentanes, with larger or smaller amounts of chlorin-containing derivatives of other hydrocarbons with more and less carbon. This is not disadvantageous for the present purpose since the presence of certain amounts of other alcohols is desirable in amyl alcohol (fusel oil) for commercial purposes. There are a number of monochlor derivatives of the various pentanes and these chlorin derivatives differ materially in their action with various reagents. On treatment however with many organic salts of the alkali metals, such as the acetate of sodium, they may be converted into the corresponding esters, such as the acetates. In this conversion into acetates, as we have elsewhere described and claimed, (see our application 65708, filed December 8, 1915) the conversion is very much facilitated and the amount of product enhanced by mechanically agitating the mixture during the action.

These processes however, as stated, give esters (acetates) of the amyl alcohols and not the amyl alcohols themselves. For a number of purposes the amyl alcohols, rather than their esters, are desirable. It is in practice however considerably more difficult to make the alcohols from these chlorinated derivatives than it is to make the acetates for the reason that the action of alkalis upon these monochlor substitution products in many cases tends to give a hydrocarbon rather than an alcohol. In direct saponification of the chlorin substitution products of these hydrocarbons with the aid of alkalis or alkalin carbonates, therefore, the reaction is apt to be but little productive; that is there is a relatively small proportion of alcohols formed.

We have however found that by adopting certain expedients we can produce a large yield of alcohols from these chlorinated products; and that the alcohols obtained instead of representing, as does the product from simple direct saponification, only certain of the chlorin substitution compounds represents substantially all these chlorin compounds. We have found that where chlorinated pentanes and the like, or the stated chlorinated gasolene fractions, are heated together with a lower alcohol, which is best methyl alcohol, and a formate, instead of the reaction going forward to produce the amyl esters, an entirely different reaction takes place. The formic acid of the formate combines with the methyl alcohol to yield methyl formate while the chlorin combines with the metal of the formate to form the corresponding chlorid. In this action, the amyl chlorids, and the other high boiling chlorids, form amyl and other alcohols. The gross result of the action therefore is the conversion of the formate into a chlorid, the conversion of a large portion of the methyl alcohol into the corresponding formate and the production of amyl and other high boiling alcohols. It is probable that in this reaction the first result is the formation of an amyl formate which then again breaks up, by double exchange with the methyl alcohol, to form methyl formate and the higher alcohol; but we do not limit ourselves to this theory of action although we regard it as probable. In a way, it may be said that the affinity of the methyl alcohol for the formic acid is greater than that of the amyl alcohol so that when the amyl chlorid reacts with the formate to produce amyl formate and the chlorid, the amyl formate is then again broken up by the methyl alcohol to form the methyl formate. As stated, however, this is theory. There appears to be a balanced reaction and as we have found, if sufficient methyl alcohol and sufficient formate are present, we obtain the amyl alcohols and methyl formate. We find that as a rule it is desirable to use somewhat more formate than corresponds to the amyl chlorids; say a molecule and a quarter or a molecule and a half. We ordinarily employ methyl alcohol in the proportion of four or five times as many gallons as there are gallons of the liquid chlorination product treated. We find that sodium formate, which is the most available formate commercially, is also the best adapted for the present purposes since it combines an anhydrous nature with a considerable degree of solubility in the fluids placed in reaction. This solubility is convenient for a number of reasons later appearing. We shall therefore hereinafter speak more specifically of sodium formate while wishing it understood that calcium formate, potassium formate, etc., may also be employed.

While the stated production of amyl alcohol will take place at a variety of temperatures and under a variety of conditions, it being indeed possible to effect the reaction under a well cooled reflux condenser, yet for the sake of speed and a variety of other reasons it is best to perform the process under pressure and at a relatively high temperature. We find that a temperature range between, say, 140° C. and 190° C. is on the whole best adapted. The pressure may be that corresponding to the temperature. Methyl alcohol boils at 66° to 67° C. while the methyl formate, which is one of the products of the reaction, boils at about 32–33° C., so that the progress of the reaction may be followed by watching the indications of a pressure gage. As long as methyl formate is being produced, the temperature remaining the same, the pressure will tend to rise. When the pressure remains stationary, the reaction is practically finished. The reaction is very much accelerated and the product is rendered greater by a rotation of the container during the operation. As to the exact reason for this improvement in speed and yield we are not positive; but it is probably in part due to the thorough admixture of the liquids, to the maintenance of the concentration of the dissolved formate in the reaction liquids, to friction exposing fresh surfaces of formate for action by the liquids, etc.

After the reaction is complete, the reaction liquid will contain methyl formate, the excess of methyl alcohol and most or all of the excess of the formate employed, if this formate be sodium formate. It also contains the amyl and other alcohols produced by the reaction. The chlorid, as for example sodium chlorid, produced is not soluble to any extent in the reaction liquids and remains as a crystal powder. After the heating the reaction liquid may be cooled, separated from the salt and fractionally distilled. The methyl formate and the methyl alcohol may be collected together or separated as may be desired. After distilling off the methyl formate and the methyl alcohol, the fusel oil (that is the mixture of amyl alcohols with other high boiling alcohols formed) may be distilled off. The residue contains the excess of sodium formate which may be reused. The crystalline mass of the salt separated from the reaction liquid on cooling contains but little formate. If it be desired to recover this formate it may be done by fractional crystallization or by extraction with hot methyl alcohol. The methyl formate may be saponified with soda or sodium carbonate to regain sodium formate and methyl alcohol. If the methyl alcohol and methyl formate are separated in the original distillation, the mixture may be similarly saponified and then redistilled to regain sodium formate.

In a specific embodiment of our invention, we first fractionate natural gas gasolene, low boiling commercial gasolene or the like, to produce a mixture of hydrocarbons boiling between 25 and 45° C. or thereabout. If we wish ultimately a larger proportion of low boiling alcohols, these gasolene fractions may be taken from 20° C. up and similarly if we desire a larger proportion of alcohols still higher boiling than amyl alcohol, we may take a somewhat higher boiling gasolene fraction; say up to 50 or 60° C. In this connection it may be stated that while we consider our invention as more particularly applicable to the production of an artificial or synthetic fusel oil of the same properties and composition as the ordinary fusel oil of commerce, which is a mixture of amyl alcohols containing more or less of the butyl alcohols and of the hexyl alcohols, yet it is by no means restricted thereto and may be applied to the production of other high boiling alcohols; as for example, the production of alcohol mixtures consisting mainly of butyl alcohol; or of hexyl alcohol. Heptyl, octyl, etc., alcohols may also be so prepared.

Our process is also of course applicable to the treatment of chlorinated products obtained from the pure hydrocarbons such as normal pentane, isopentane, etc.

Having obtained the stated gasolene fraction, we next chlorinate it by a regulated action of chlorin thereon in the presence of a controlled source of actinic light. Generally the chlorination is so conducted as to chlorinate about 20 per cent. of the material and the chlorinated products are then separated from the remaining hydrocarbons by fractional distillation. Being higher boiling than the hydrocarbons from which they are derived, this separation is easy. The remaining unchlorinated fraction of the hydrocarbons is again treated with chlorin.

Having obtained the monochlor derivatives, we place the material, which is in liquid form, in any suitable apparatus. We regard, as stated, an apparatus capable of rotation as being the best adapted for our purposes. To this material is added methyl alcohol in the proportion of about 3 or 4 gallons for every gallon of chlorinated material. We also add about 6 pounds of commercial dry sodium formate for each gallon of the chlorinated material. The mixture is next heated in a sealed container or autoclave to about 160° C., though the temperature may be higher or lower. During the heating the methyl formate produced may be continuously removed through a suitable weighted valve beyond a fractionating column. But this is not necessary and we usually do not so operate. The retention of the methyl formate in the mixture has the convenience that it allows following the operation by the indications of a pressure gage. At 160°, it will be found that ordinarily about six hours' heating will bring the reaction to a finish. The reaction mixture is next cooled or chilled and removed from the insoluble salts, which, as stated, consists mainly of common salt (sodium chlorid). The salt may be washed with a little methyl alcohol to remove any adhering formate and then discarded. Or it may be washed with a small amount of water to extract the formate and the dissolved salt and formate separated by crystallization. The liquid removed from the salt contains some sodium formate in solution but practically no salt. This liquid we next distil. The methyl formate comes over first and should be condensed in an artificially chilled condenser. The excess of methyl alcohol follows and is also condensed. As stated, the methyl alcohol and methyl formate may or may not be collected together. If they are collected separately, the methyl formate is heated with a little soda or sodium carbonate and the methyl alcohol produced distilled off from the sodium formate which may then be reused. Or the whole mixture of methyl alcohol and methyl formate may be so treated with soda.

If the methyl formate and methyl alcohol are distilled off, the residual liquid in the still contains the amyl and other high boiling alcohols produced. The alcohols are next distilled over and condensed in any of the usual manners. Ordinarily there is a substantial residue of saline matter in the still which represents the excess of sodium formate employed. This sodium formate may be reused. The amyl alcohol distillate produced is redistilled or otherwise treated in any of the manners usual in the treatment of commercial fusel oil.

The materials used in the present invention are all non-corrosive and no corrosive substances are produced in the reaction so that iron and steel apparatus may be employed. Copper stills and reaction vessels may be employed but are not necessary.

What we claim is:—

1. The method of producing high boiling monohydric alcohols which comprises heating the corresponding chlorin compounds with a mixture of methyl alcohol and a formate.

2. The process of producing artificial fusel oil which comprises heating a mixture of a monochlorinated low boiling gasolene fraction with methyl alcohol and a formate.

3. The method of producing high boiling monohydric alcohols which comprises heating the corresponding chlorin compounds with a mixture of methyl alcohol and a formate under pressure.

4. The process of producing artificial fusel oil which comprises heating a mixture of a monochlorinated low boiling gasolene fraction with methyl alcohol and a formate under pressure.

5. The method of producing high boiling monohydric alcohols which comprises heating the corresponding chlorin compounds with a mixture of methyl alcohol and a formate under pressure at a temperature between 140° and 190° C.

6. The process of producing artificial fusel oil which comprises heating a mixture of a monochlorinated low boiling gasolene fraction with methyl alcohol and a formate under pressure at a temperature between 140° and 180° C.

7. In the manufacture of high boiling monohydric alcohols, the process which comprises heating a mixture of a corresponding chlorin compound with methyl alcohol and sodium formate under pressure at a temperature between 140° and 160° C. until the pressure ceases to increase.

8. The process of making a high boiling monohydric alcohol which comprises heating a mixture of the corresponding chlorin compound with sodium formate and methyl alcohol under pressure to a temperature between 140° and 160° C., the sodium formate being used in a proportion slightly greater than that corresponding to such chlorin compound, cooling the mixture and redistilling to obtain methyl formate, methyl alcohol, and the higher boiling alcohol produced, and a residue representing the excess of the formate employed.

9. In the manufacture of high boiling monohydric alcohols, the process which comprises heating a mixture of a chlorinated hydrocarbon corresponding to the alcohol to be obtained with sodium formate and methyl alcohol under pressure at a temperature between 140° and 160° C., recovering the methyl alcohol and the methyl formate produced as well as the high boiling alcohol formed and treating the methyl formate with soda to reform sodium formate.

In testimony whereof, we affix our signatures hereto.

BENJAMIN T. BROOKS.
HARRY ESSEX.